(12) United States Patent
Beck et al.

(10) Patent No.: US 11,814,194 B2
(45) Date of Patent: *Nov. 14, 2023

(54) SATELLITE DEPLOYER WITH COMPOSITE GUIDE RAIL

(71) Applicant: Rocket Lab USA, Inc., Huntington Beach, CA (US)

(72) Inventors: Peter Beck, Auckland (NZ); Peter Barlow, Huntington Beach, CA (US); David Yoon, La Crescenta, CA (US); Ben Malcolm, Auckland (NZ)

(73) Assignee: Rocket Lab USA, Inc., Long Beach, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 17/466,723

(22) Filed: Sep. 3, 2021

(65) Prior Publication Data

US 2021/0394934 A1 Dec. 23, 2021

Related U.S. Application Data

(63) Continuation of application No. 16/051,268, filed on Jul. 31, 2018, now Pat. No. 11,148,830.

(Continued)

(51) Int. Cl.
*B64G 1/22* (2006.01)
*F16C 29/00* (2006.01)
(Continued)

(52) U.S. Cl.
CPC .............. *B64G 1/22* (2013.01); *B26D 5/12* (2013.01); *B60P 7/135* (2013.01); *B60P 7/16* (2013.01);
(Continued)

(58) Field of Classification Search
CPC .......... B64G 1/22; B64G 1/007; B64G 1/222; B64G 1/645; B64G 1/641; B26D 5/12;
(Continued)

(56) References Cited

U.S. PATENT DOCUMENTS 3,144,956 A * 8/1964 Anderson ................ E05C 9/18
292/25
3,991,649 A * 11/1976 Patrichi ................... F42B 3/006
60/636
(Continued)

FOREIGN PATENT DOCUMENTS

| CN | 106081170 | 11/2016 |
| KR | 20160147547 | 12/2016 |
| WO | 2008034550 | 3/2008 |

OTHER PUBLICATIONS

"Small Spacecraft Technology State of the Art", Dec. 2015, NASA Mission Design Division, pp. 125-129 (Year: 2015).
(Continued)

*Primary Examiner* — Medhat Badawi
(74) *Attorney, Agent, or Firm* — Van Pelt, Yi & James LLP

(57) ABSTRACT

A satellite dispenser is disclosed. In various embodiments, a satellite dispenser as disclosed herein includes a dispenser body defining an interior cavity configured to receive a payload; and a composite guide rail comprising a groove configured to receive at least a portion of a payload, the composite guide rail having an orientation that substantially aligns a longitudinal axis of the groove with an ejection axis of the dispenser.

22 Claims, 6 Drawing Sheets

Related U.S. Application Data

(60) Provisional application No. 62/541,493, filed on Aug. 4, 2017.

(51) Int. Cl.
| | | |
|---|---|---|
| *F16C 33/24* | (2006.01) | |
| *E05D 3/08* | (2006.01) | |
| *E05D 7/00* | (2006.01) | |
| *E05F 3/20* | (2006.01) | |
| *B60P 7/135* | (2006.01) | |
| *B60P 7/16* | (2006.01) | |
| *B26D 5/12* | (2006.01) | |
| *E05F 1/10* | (2006.01) | |
| *B64G 1/64* | (2006.01) | |
| *B64G 1/00* | (2006.01) | |
| *F42B 3/00* | (2006.01) | |

(52) U.S. Cl.
CPC ............ *E05D 3/08* (2013.01); *E05D 7/00* (2013.01); *E05F 1/105* (2013.01); *E05F 3/20* (2013.01); *F16C 29/005* (2013.01); *F16C 33/24* (2013.01); *B64G 1/007* (2013.01); *B64G 1/222* (2013.01); *B64G 1/645* (2013.01); *E05Y 2201/216* (2013.01); *E05Y 2201/426* (2013.01); *E05Y 2900/50* (2013.01); *E05Y 2900/531* (2013.01); *F16C 2208/82* (2013.01); *F16C 2223/32* (2013.01); *F16C 2326/47* (2013.01); *F42B 3/006* (2013.01)

(58) Field of Classification Search
CPC ... B60P 7/135; B60P 7/16; E05D 3/08; E05D 7/00; E05F 1/105; E05F 3/20; F16C 29/005; F16C 33/24; F16C 2208/82; F16C 2223/32; F16C 2326/47; E05Y 2201/216; E05Y 2201/426; E05Y 2900/50; E05Y 2900/531; F42B 3/006
See application file for complete search history.

(56) References Cited

U.S. PATENT DOCUMENTS

| | | | | |
|---|---|---|---|---|
| 4,210,274 | A * | 7/1980 | Leonard | B65D 5/445 229/918 |
| 4,540,873 | A * | 9/1985 | Kester | B64G 1/222 83/171 |
| 4,771,971 | A * | 9/1988 | Ludwig | B64G 1/641 244/173.1 |
| 4,779,826 | A * | 10/1988 | Kiendl | B64G 1/645 410/38 |
| 4,936,367 | A * | 6/1990 | Marello | B64G 1/222 160/1 |
| 4,984,666 | A * | 1/1991 | Orii | A47K 13/10 192/223.4 |
| 5,050,821 | A * | 9/1991 | Kerstein | B64G 1/14 52/79.5 |
| 5,109,571 | A * | 5/1992 | Ohshima | E05D 11/06 16/284 |
| 5,364,046 | A * | 11/1994 | Dobbs | B64G 1/646 244/172.4 |
| 5,462,800 | A * | 10/1995 | Yamazaki | C04B 41/009 423/447.5 |
| 5,664,897 | A * | 9/1997 | Hennings | F42B 3/00 83/639.4 |
| 5,743,492 | A * | 4/1998 | Chan | B64G 1/401 102/378 |
| 5,755,406 | A * | 5/1998 | Aston | B64G 1/22 244/159.4 |
| 5,755,407 | A * | 5/1998 | Aubret | B64G 1/641 244/137.4 |
| 5,848,766 | A * | 12/1998 | Thompson | B64G 1/60 244/173.1 |
| 6,126,115 | A * | 10/2000 | Carrier | B64G 1/641 294/82.26 |
| 6,227,493 | B1 * | 5/2001 | Holemans | B64G 1/641 285/82 |
| 6,357,699 | B1 * | 3/2002 | Edberg | B64G 1/645 102/377 |
| 6,532,628 | B2 * | 3/2003 | Kim | G06F 1/1601 16/337 |
| 6,668,985 | B2 * | 12/2003 | Krenkel | F16D 69/023 188/251 A |
| 6,869,048 | B2 * | 3/2005 | Draisey | B64G 1/62 244/158.9 |
| 6,886,221 | B2 * | 5/2005 | Minami | H04M 1/0216 361/679.01 |
| 6,901,836 | B1 * | 6/2005 | Valembois | B26F 3/04 225/6 |
| 6,904,644 | B2 * | 6/2005 | Oshima | G06F 1/1679 16/303 |
| 6,905,097 | B2 * | 6/2005 | Blackwell-Thompson | B64C 1/20 244/173.1 |
| 7,065,834 | B2 * | 6/2006 | Lowry | G06F 1/1679 16/334 |
| 7,107,648 | B1 * | 9/2006 | Lu | H04M 1/0216 16/330 |
| 7,111,773 | B1 * | 9/2006 | So | G06F 1/1679 235/1 D |
| 7,155,780 | B2 * | 1/2007 | Chen | H04M 1/0216 16/326 |
| 7,213,301 | B2 * | 5/2007 | Sakai | H04M 1/0216 16/303 |
| 7,350,664 | B2 * | 4/2008 | Nam | E05F 1/12 220/264 |
| 7,386,918 | B2 * | 6/2008 | Tomizawa | G06F 1/1681 16/303 |
| 7,401,381 | B2 * | 7/2008 | Konja | E05F 1/1016 16/303 |
| 7,543,357 | B2 * | 6/2009 | Ishikawa | H04M 1/0216 16/303 |
| 7,634,838 | B2 * | 12/2009 | Ge | H04M 1/0216 16/303 |
| 7,699,378 | B2 * | 4/2010 | Smith | B62D 33/03 49/386 |
| 7,712,186 | B2 * | 5/2010 | Kang | E05F 3/20 16/330 |
| 7,814,620 | B2 * | 10/2010 | Lin | H04M 1/0216 16/284 |
| 8,079,115 | B2 * | 12/2011 | Zhang | H04M 1/0216 16/326 |
| 8,132,292 | B2 * | 3/2012 | Patterson | H04M 1/0216 16/340 |
| 8,138,982 | B1 | 3/2012 | West | |
| 8,424,160 | B2 * | 4/2013 | Chen | G06F 1/1681 16/295 |
| 8,432,677 | B2 * | 4/2013 | Duan | G06F 1/1681 361/755 |
| 8,459,754 | B2 * | 6/2013 | Cho | D06F 39/14 16/285 |
| 8,745,820 | B2 * | 6/2014 | Janak | E05F 3/12 188/290 |
| 8,769,770 | B2 * | 7/2014 | Kullman | E05F 5/00 220/908 |
| 9,115,519 | B2 * | 8/2015 | Li | E05F 5/00 |
| 9,289,879 | B2 * | 3/2016 | Copeland | B24B 55/052 |
| 9,290,880 | B2 * | 3/2016 | Park | D06F 39/14 |
| 9,394,645 | B2 * | 7/2016 | Park | D06F 39/14 |
| 9,414,724 | B2 * | 8/2016 | Vallance | A47K 13/12 |
| 9,434,486 | B1 * | 9/2016 | Santos | B64G 1/64 |
| 9,464,376 | B2 * | 10/2016 | Kim | D06F 39/14 |
| 9,725,940 | B2 * | 8/2017 | Lambright | E05F 1/123 |
| 9,796,488 | B2 * | 10/2017 | Cook | B64G 1/646 |
| 10,011,373 | B1 * | 7/2018 | Echelman | F16B 7/0406 |
| 10,017,279 | B2 * | 7/2018 | Poncet | B64G 1/641 |
| 10,053,243 | B2 * | 8/2018 | Apland | B64G 1/645 |
| 10,370,124 | B2 | 8/2019 | Dube | |
| 10,569,910 | B2 | 2/2020 | Bogdanov | |

(56) References Cited

U.S. PATENT DOCUMENTS

| | | | |
|---|---|---|---|
| 10,689,133 B2* | 6/2020 | Cheynet de Beaupre | B64G 1/1021 |
| 10,773,831 B2* | 9/2020 | Wang | B64G 1/36 |
| 2003/0192522 A1* | 10/2003 | Taryoto | A63B 69/406 |
| | | | 124/78 |
| 2005/0045771 A1* | 3/2005 | Caldwell | B64G 1/645 |
| | | | 244/137.4 |
| 2005/0230562 A1* | 10/2005 | Buehler | B64G 1/645 |
| | | | 244/173.1 |
| 2006/0049317 A1* | 3/2006 | Reutenauer | B64G 1/222 |
| | | | 244/172.9 |
| 2012/0112010 A1* | 5/2012 | Young | B64G 1/641 |
| | | | 244/173.1 |
| 2012/0280085 A1* | 11/2012 | Sinclair | B64D 1/12 |
| | | | 244/137.3 |
| 2013/0099059 A1* | 4/2013 | Cheynet De Beaupre | B64G 1/10 |
| | | | 244/158.1 |
| 2013/0282117 A1* | 10/2013 | Van Heugten | A61F 2/14 |
| | | | 623/6.22 |
| 2014/0117028 A1* | 5/2014 | Huber | B29C 70/304 |
| | | | 248/346.02 |
| 2014/0131521 A1* | 5/2014 | Apland | B64G 1/641 |
| | | | 244/173.3 |
| 2014/0319283 A1* | 10/2014 | Holemans | B64G 1/641 |
| | | | 244/173.3 |
| 2016/0075452 A1* | 3/2016 | Robles | B64G 1/64 |
| | | | 244/173.3 |
| 2016/0200459 A1* | 7/2016 | Aston | F28D 15/0275 |
| | | | 165/41 |
| 2016/0207605 A1* | 7/2016 | Jensen | B64B 1/40 |
| 2017/0072647 A1* | 3/2017 | Perrillat | B29C 70/36 |
| 2017/0081011 A1* | 3/2017 | Matthews | B64B 1/62 |
| 2017/0174368 A1* | 6/2017 | Dube | B64G 1/641 |
| 2017/0225873 A1* | 8/2017 | Fougere | B65D 83/0418 |
| 2017/0320597 A1* | 11/2017 | Lim | B64G 1/222 |
| 2017/0327253 A1* | 11/2017 | Bogdanov | B64G 1/645 |
| 2018/0194494 A1* | 7/2018 | Dube | B64G 1/002 |
| 2021/0394934 A1* | 12/2021 | Beck | F16C 33/24 |

OTHER PUBLICATIONS

Donaldson et al. "Ejection and Recovery System for Cubesat Sized Ejectables on Sounding Rockets". Apr. 22, 2017. Retrieved from the Internet on Sep. 19, 2018. URL: <https://web.archive.org/web/20170422053555/http://rexusbexus.net/wp-content/uploads/2015/06/Suineadh-_IAC-Paper. pdf>.

Holemans et al. "Canisterized Satellite Dispenser (CSD) as a Standard for Integrating and Dispensing Hosted Payloads on Large Spacecraft and Launch Vehicles", May 2014.

Steve Furger, "Analysis and Mitigation of the Cubesat Dynamic Environment" (Year: 2013).

\* cited by examiner

SATELLITE DEPLOYER WITH COMPOSITE GUIDE RAIL

CROSS REFERENCE TO OTHER APPLICATIONS

This application is a continuation of U.S. patent application Ser. No. 16/051,268, entitled SATELLITE DEPLOYER WITH COMPOSITE GUIDE RAIL filed Jul. 31, 2018 which is incorporated herein by reference for all purposes, which claims priority to U.S. Provisional Application No. 62/541,493, entitled SMALL SCALE SATELLITE DEPLOYER filed Aug. 4, 2017 which is incorporated herein by reference for all purposes.

GOVERNMENT LICENSE RIGHTS

This invention was made with Government support under Contract No. 2014-14031000011 awarded by a United States Government Agency. The United States Government has certain rights in the invention.

BACKGROUND OF THE INVENTION

Small scale satellites, such as CubeSat or other small satellites, may be launched into space in a launch vehicle that includes a plurality of such satellites, each contained in a "dispenser" device, sometimes referred to as a small scale satellite "deployer", configured to deploy the small scale satellite in a controlled manner, e.g., to achieve a target orbit. The terms "dispenser" and "deployer" are used interchangeably in this specification.

Satellites conforming to the CubeSat Design Specification may have a size and form factor of a corresponding type or class of CubeSat as defined by the standard. The size and form factor of a CubeSat is based on a standard 10×10×11.35 cm3 unit designed to provide 10×10×10 cm3 (or 1 liter) of useful volume. CubeSats of different types may comprise a different number of such units. For example, CubeSats comprising 1, 3, 6, or 12 units, sometimes designated as 1U, 3U, 6U, and 12U CubeSats, respectively, may be encountered. Other satellites comprising other whole or fractional numbers of standard units may be launched and deployed.

Small scale satellite dispensers typically have a shape, size, and form factor to accommodate a corresponding small scale satellite, and commonly have a door that provides access to a payload area of the dispenser. The small scale satellite (payload) is loaded into the dispenser through the opening associated with the door, with the door in the open position. The door is closed and secured in the closed position. The dispenser may be arranged with other dispensers in a chassis configured to accommodate multiple dispensers. The chassis is loaded into a launch vehicle, such as a rocket, and launched into space. Control circuits initiate deployment of the small scale satellite at a time, orientation, etc. associated with the target orbit of each respective small scale satellite. Typically, a satellite is deployed by causing the dispenser door to open at a precise time, resulting in the small scale satellite being ejected from the dispenser and into orbit. Solar panels, antennae, and other appendages and auxiliary equipment may open, extend, or otherwise deploy once the small scale satellite has been ejected from the dispenser.

BRIEF DESCRIPTION OF THE DRAWINGS

Various embodiments of the invention are disclosed in the following detailed description and the accompanying drawings.

DETAILED DESCRIPTION

Figure 1A:
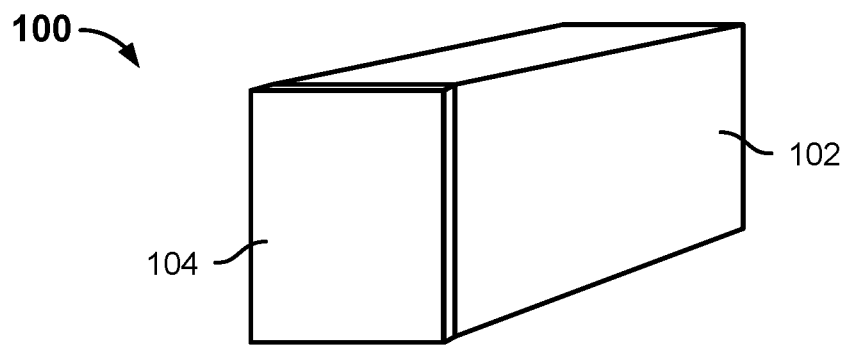
FIG. 1A is a diagram illustrating an embodiment of a small scale satellite dispenser.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A satellite dispenser with composite guide rails is disclosed. In various embodiments, a dispenser as disclosed herein may include in each of four interior corners a guide rail. The guide rail may comprise a composite/laminate structure. An interior glide surface of the rail(s) may be impregnated with silicon carbide or another hard material. The guide rails may be carbon composite laminates that conform to the shape of the dispenser along an associated dimension of the dispenser, such as the longitudinal satellite insertion/ejection axis of the dispenser, e.g., to utilize the minimum amount of material to save costs and to provide a rigid backbone for the structure.

In various embodiments, the rails are carbon composite rails with a layer of silicon carbide on the payload dispenser interface. The silicon carbide provides a very hard and smooth surface for the CubeSat rails to interface with. In some embodiments, the silicon carbide layer is laid right on top of the carbon fiber laminate layers during the fabrication process.

In various embodiments, a dispenser as disclosed herein includes a pusher plate assembly inside the dispenser at an end opposite the door. A payload loaded into the dispenser pushes against the pusher plate, compressing a main spring of the pusher plate assembly. When the dispenser door is released, the spring extends exerting force that pushes the payload out of the dispenser.

In some embodiments, a protrusion or other structure of a pusher plate rides inside the central groove or valley of a guide rail as disclosed herein. In some embodiments, the pusher plate includes such a protrusion at each of its four corners to maintain alignment with respect to internal guide rails. The protrusion may include or be covered by a cover or insert comprising durable low friction material, such as Teflon™.

FIG. 1A is a diagram illustrating an embodiment of a small scale satellite dispenser. In the example shown, dispenser 100 includes a dispenser casing or body 102 with a door 104 at one end. In the state shown in FIG. 1A, the dispenser door 104 is closed, as it would be subsequent to a small scale satellite being loaded into the dispenser 100 but before deployment.

Figure 1B:
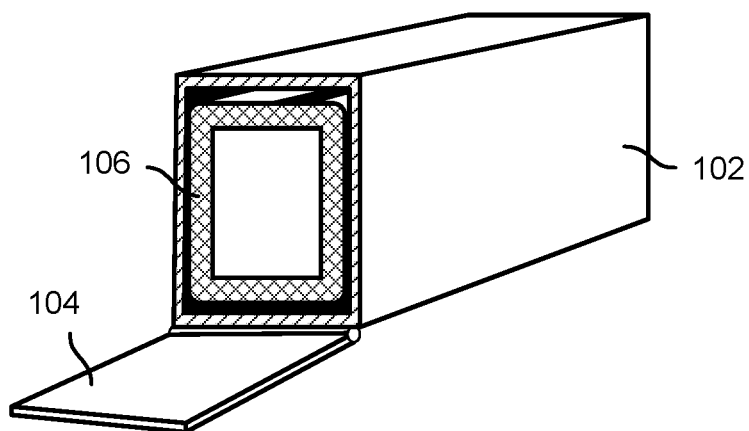
FIG. 1B is a diagram illustrating an embodiment of the small scale satellite dispenser 100 of FIG. 1A with the door 104 open.

FIG. 1B is a diagram illustrating an embodiment of the small scale satellite dispenser 100 of FIG. 1A with the door 104 open. A small scale satellite 106 is visible in the payload area defined by dispenser body 102. The state shown in FIG. 1B may be associated with loading the payload 106 into the dispenser 100, but prior to the door 104 being closed, and/or just prior to ejection of payload 106 after the door 104 being opened.

Figure 1C:
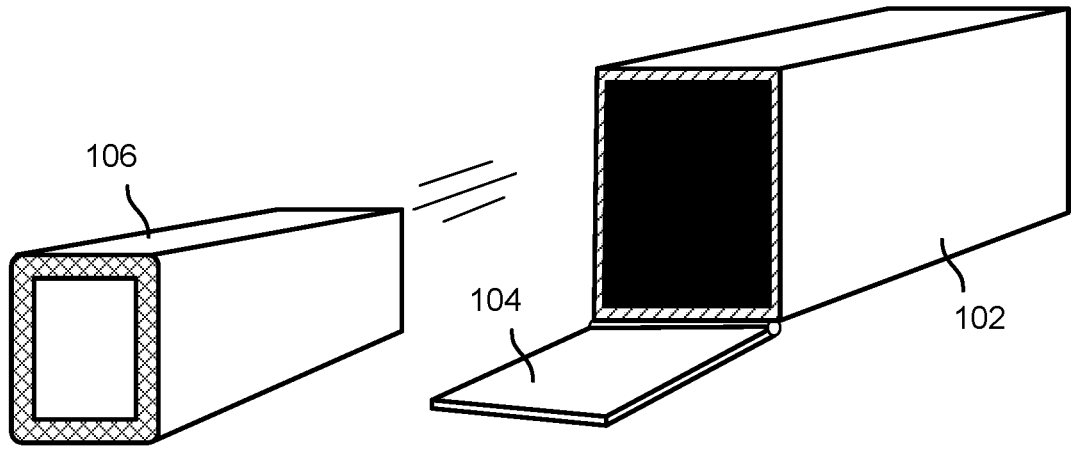
FIG. 1C is a diagram illustrating an embodiment of the small scale satellite dispenser 100 of FIG. 1A with the door 104 open and the payload 106 ejected from the payload area defined by dispenser body 102.

FIG. 1C is a diagram illustrating an embodiment of the small scale satellite dispenser 100 of FIG. 1A with the door 104 open and the payload 106 ejected from the payload area defined by dispenser body 102. In various embodiments, the payload 106 may have been ejected at least in part by a spring-loaded pusher plate against which the payload 106 had been pressed against during loading of payload 106 into dispenser 100, thereby compressing one or more springs associated with the pusher plate.

In various embodiments, the state of dispenser 100 as shown in FIGS. 1B and 1C is attained at least in part by activating a door release mechanism (not shown in FIGS. 1A through 1C) configured to hold door 104 in the closed position prior to activation. Upon activation of the door release mechanism, the door 104 is no longer held in the closed position. In various embodiments, one or more springs compressed by closing door 104 and securing door 104 in the closed position may, upon activation of the door release mechanism, cause the door 104 to be pushed open, as in FIGS. 1B and 1C, allowing the payload 106 to be ejected, as shown in FIG. 1C.

Figure 2A:
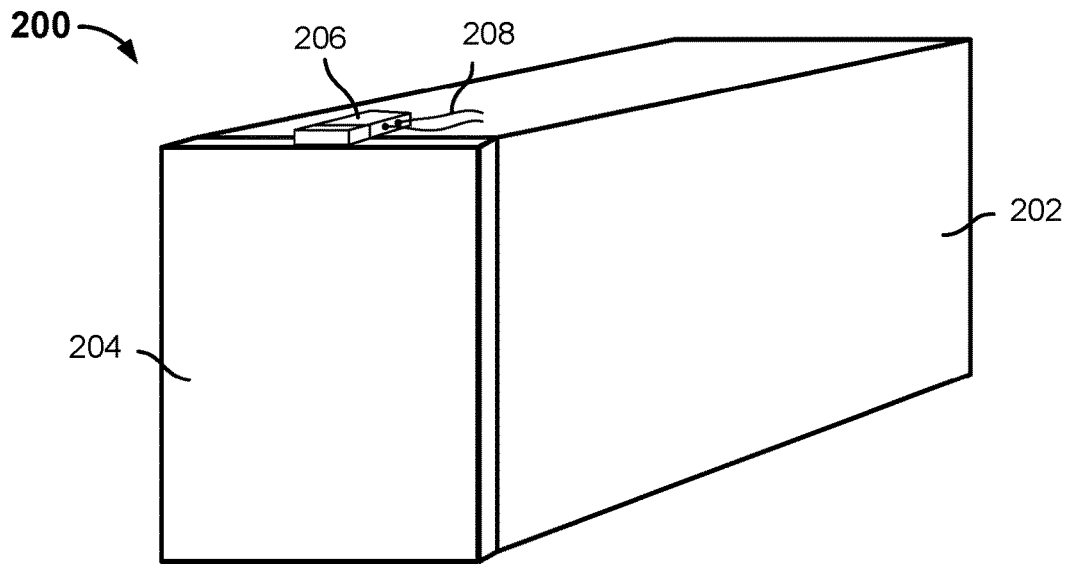
FIG. 2A is a diagram illustrating an embodiment of a small scale satellite dispenser provided with a pyrotechnic cutter door release mechanism prior to cutter activation.

FIG. 2A is a diagram illustrating an embodiment of a small scale satellite dispenser provided with a pyrotechnic cutter door release mechanism prior to cutter activation. In the example shown, satellite dispenser 200 includes a dispenser body 202 and door 204. The door 204 is held closed in the state shown by a door release mechanism 206 which in this example includes a wire or cable (not shown in FIG. 2A) to hold the door closed prior to deployment and two pyrotechnic cutters positioned and configured to cut the wire or cable to release the door 204 to enable the door 204 to open. In the example shown, electrical leads 208 are connected to the pyrotechnic cutters included in door release mechanism 206. In various embodiments, signals and/or power to activate the pyrotechnic cutters is/are provided via leads 208, e.g., from a driver or similar component comprising and/or otherwise associated with the dispenser 200.

Figure 2B:
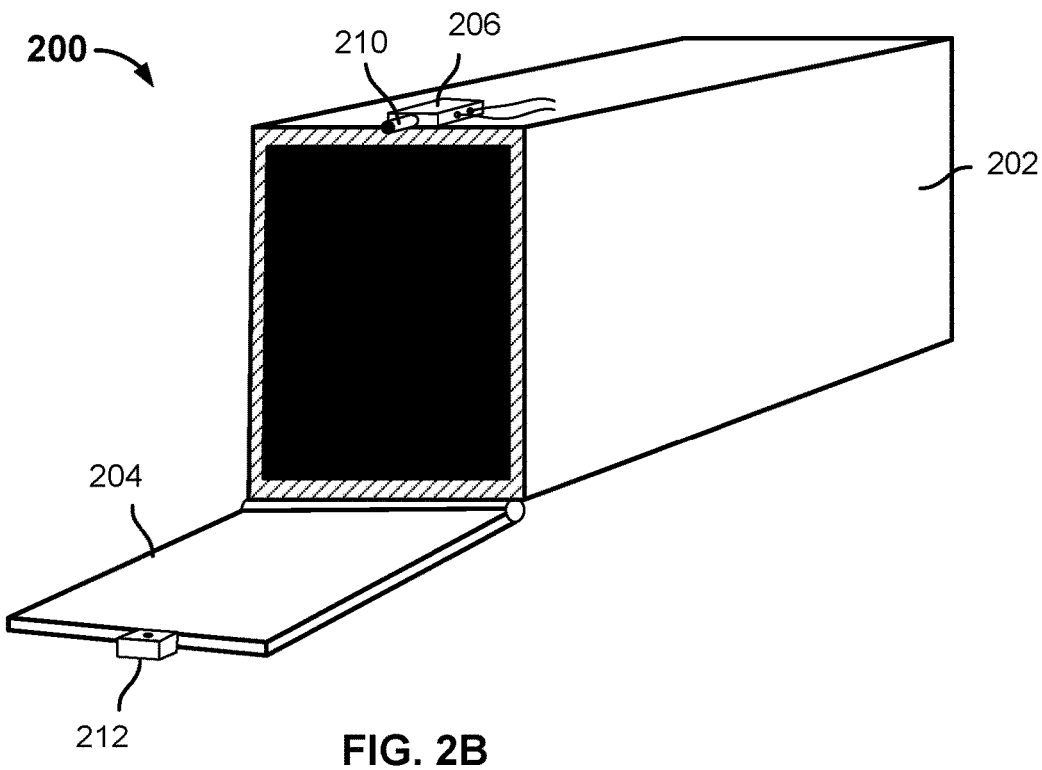
FIG. 2B is a diagram illustrating an embodiment of a small scale satellite dispenser provided with a pyrotechnic cutter door release mechanism after cutter activation.

FIG. 2B is a diagram illustrating an embodiment of a small scale satellite dispenser provided with a pyrotechnic cutter door release mechanism after cutter activation. In the state shown in FIG. 2B, the pyrotechnic cutters comprising door release mechanism 206 have been fired resulting in the cable or wire holding door 204 closed being cut. In the example shown, the door 204 has been assisted in opening by a spring-loaded pusher 210 being pushed out from the door release mechanism 206 once the wire or cable holding the door 204 shut had been cut. Also shown in FIG. 2B is a recess or cavity 212 into which a door side portion of the wire or cable that had been holding the door 204 closed has been pulled, e.g., by a spring-loaded plunger configured to extend into the cavity 212 pulling the door end of the cut wire or cable into cavity 212. In various embodiments, the wire or cable retraction mechanism configured to pull the free end of the cut wire or cable into cavity 212 ensures the loose (door) end of the cut wire or cable does not interfere with ejection and/or deployment of the small scale satellite from dispenser 200.

Figure 3A:
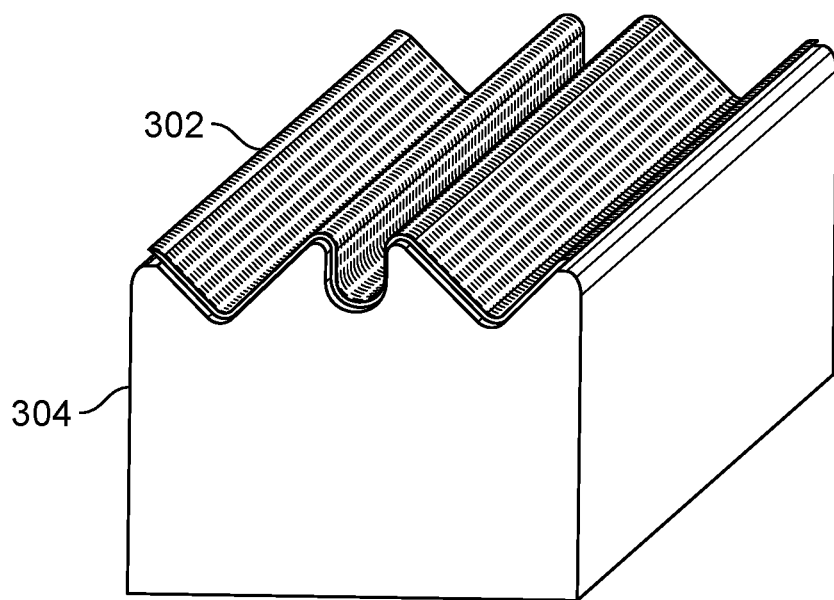
FIG. 3A is a diagram illustrating an embodiment of a composite guide rail and a mold to fabricate same.

FIG. 3A is a diagram illustrating an embodiment of a composite guide rail and a mold to fabricate same. In the example shown, layers 302 of carbon (or other) fiber reinforced fabric that has been pre-impregnated with a resin system, such as epoxy, are laid up on a mold 304. Mold 304 may be made of machined aluminum or another durable material with predictable thermal expansion behaviors for the elevated temperature at which the composite guide rail is cured.

In various embodiments, to form a composite guide rail as disclosed herein, the mold 304 is polished, laminate layers 302 are laid on top, the layers 302 are topped with a peel-ply perforated release film and breather material, and the assembly 302, 304 is placed in a vacuum bag. Once the mold 304 and laminate 302 are sealed in the vacuum bag, the bag is purged of all gasses with a vacuum pump. The assembly 302, 304 is cured in a high pressure, high temperature autoclave for the specified time required by the pre-preg laminates 302.

In various embodiments, composite guide rails as disclosed herein may be carbon composite rails with a layer of silicon carbide on the payload dispenser interface. The silicon carbide provides a very hard and smooth surface for the CubeSat rails to interface with. In some embodiments, a silicon carbide layer is laid right on top of the carbon fiber laminate layers (e.g., layers 302 in FIG. 3A) during the fabrication process.

Figure 3B:
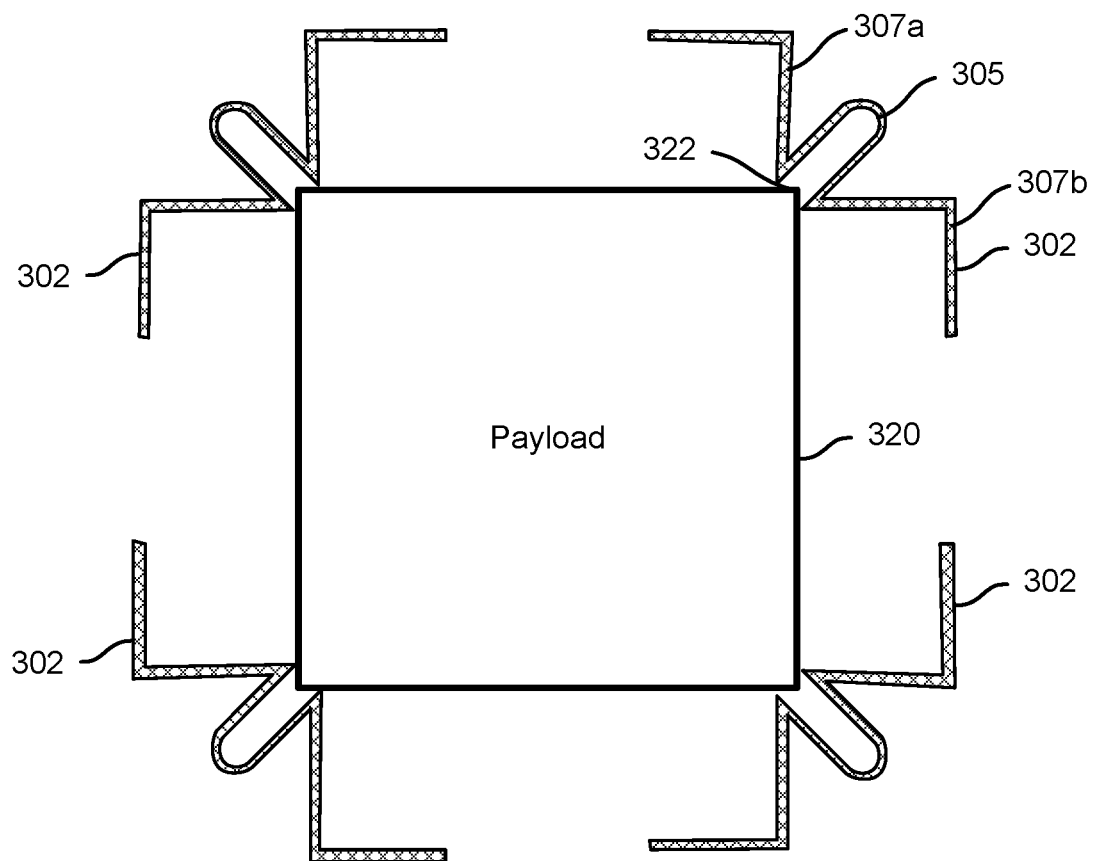
FIG. 3B is a diagram illustrating an embodiment of a satellite dispenser with composite guide rails.

FIG. 3B is a diagram illustrating an embodiment of a satellite dispenser with composite guide rails. In the example shown in FIG. 3B, a finished composite guide rail is shown in positions at the four corners of the satellite dispenser payload chamber (of the dispenser body, not shown in FIG. 3B. In various embodiments, the four corners of the payload 320, e.g., CubeSat rails or other small scale satellite corner/edge structures, engage and ride on the inner guide defined by the central lobe of the guide rail 302. In various embodiments, the silicon carbide layer on the side of guide rails 302 that face and engage the payload 320 enables the payload 320 to slide more freely along the guide rails 302, e.g., during satellite ejection and deployment.

Figure 4A:
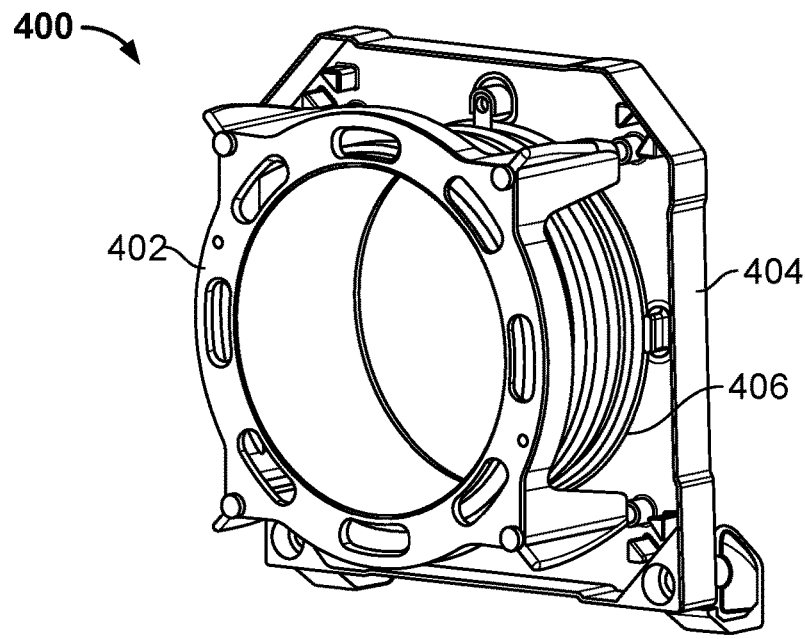
FIG. 4A is a diagram illustrating an embodiment of a satellite dispenser pusher plate assembly.

FIG. 4A is a diagram illustrating an embodiment of a satellite dispenser pusher plate assembly. In the example shown, pusher plate assembly 400 includes a pusher plate 402 coupled to a dispenser end plate or panel 404 by a spring 406. In various embodiments, a satellite loaded into a dispenser that includes pusher plate assembly 400 is pressed against the pusher plate 402, comprising spring 406, enabling the dispenser door to be closed. Upon release of the dispenser door to eject and deploy the satellite, the spring 406 extends and pushes pusher plate 402 in the direction of the dispenser door opening, which in turn pushes the satellite, riding on one or more guide rails, such as guide rails 302 of FIGS. 3A and 3B, out and through the dispenser door opening.

Figure 4B:
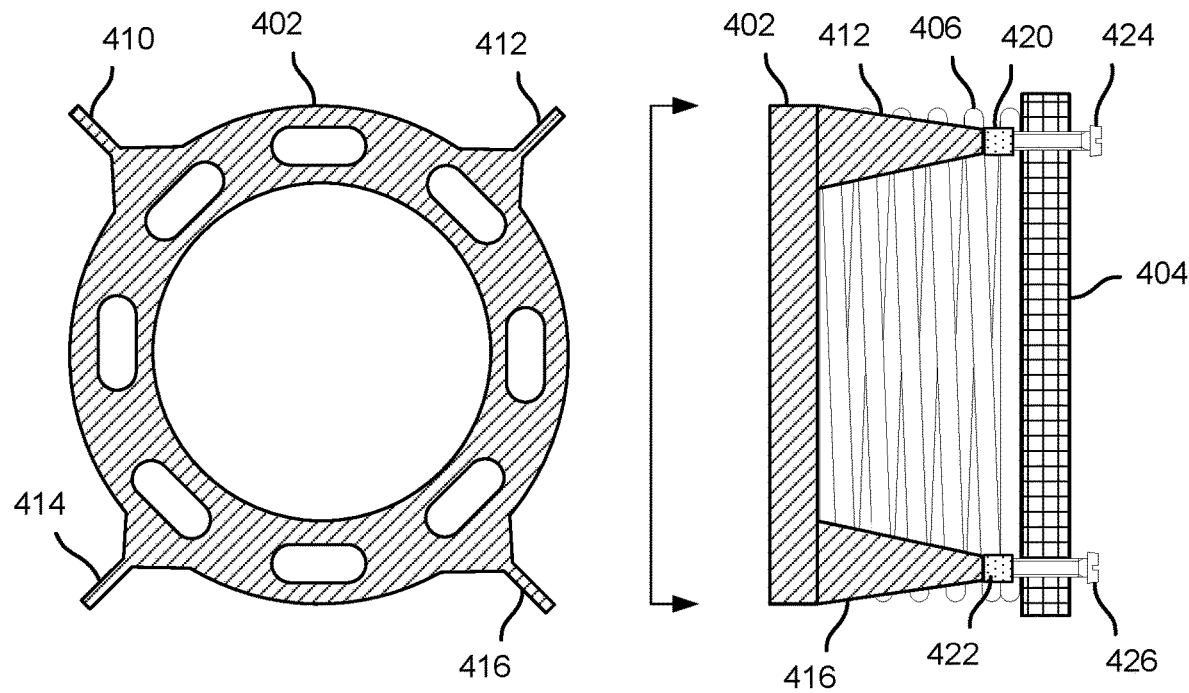
FIG. 4B is a diagram illustrating front and side views of the satellite dispenser pusher plate assembly 400 of FIG. 4A.

FIG. 4B is a diagram illustrating front and side views of the satellite dispenser pusher plate assembly 400 of FIG. 4A. As shown in FIG. 4B, the pusher plate 402 includes protrusions 410, 412, 414, and 416 at locations on pusher plate 402, each of which aligns, in various embodiments, with a corresponding groove comprising a guide rail (e.g., guide rail 302) positioned in an interior corner of a dispenser payload area.

In the example shown, protrusions 410, 412, 414, and 416 are formed as an integral part of the pusher plate 402 and extend back towards the end plate as tapered posts, the distal ends of which engage, when the dispenser is loaded and spring 406 is compressed, with corresponding nylon (or other polymer0 adjustable "feet", represented in FIG. 4B by feet 420 and 422. Each of the tapered posts comprising the four protrusions (410, 412, 414, 416) aligns opposite a corresponding one of the feet. Each of the feet (e.g., 420, 422) is adjustable in its extent into the payload area of the dispenser and/or the force applied to the pusher plate 402 via the protrusion 410, 412, 414, and 416 with which it is aligned by an adjustment screw (or similar structure), represented in FIG. 4B by adjustment screws 424 and 426. In various embodiments, the nylon (or other) feet 422, 424 and associated adjustment screws 424, 426 are torqued to a prescribed torque to secure the payload firmly in the payload area, e.g., to avoid movement during flight, which could damage the satellite.

In various embodiments, the tapered profile of the posts comprising protrusions 410, 412, 414, and 416 ensure the pusher plate 402 remains aligned properly within the dispenser and glides smoothly along the guide rails 302.

Figure 5A:
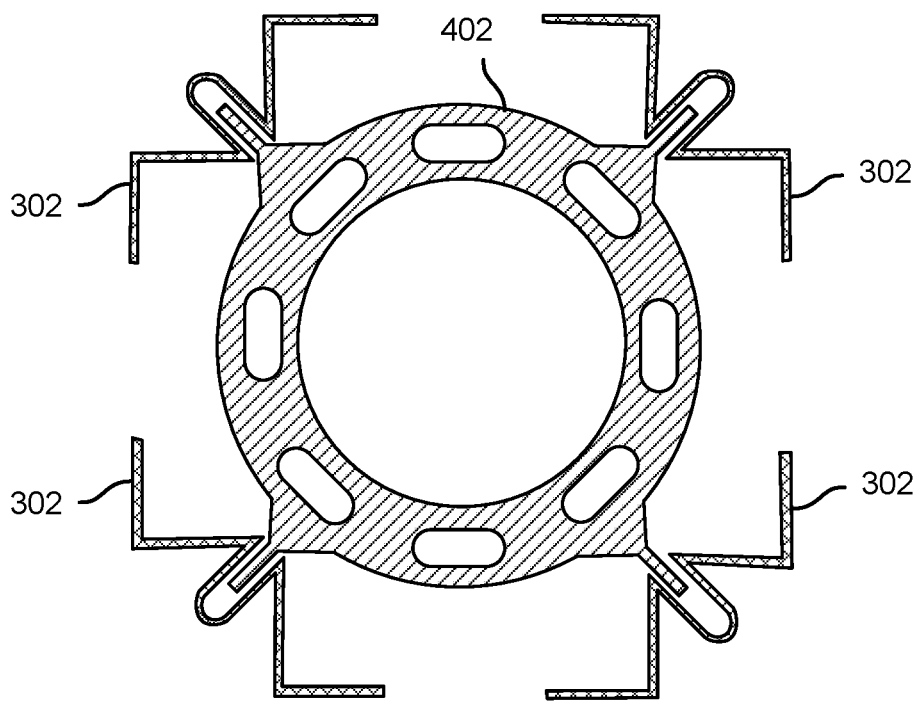
FIG. 5A is a diagram illustrating a front view of an embodiment of a satellite dispenser with composite guide rails.

FIG. 5A is a diagram illustrating a front view of an embodiment of a satellite dispenser with composite guide rails. In the example shown, the alignment of the pusher plate 402 and associated protrusions with the corresponding grooves defined by guide rails 302 is illustrated. In various embodiments, the corner protrusions of pusher plate 402 fit within the central groove of the guide rails 302 within a tolerance that ensures the pusher plate 402 slides along the guide rails 302 during payload ejection with minimal rotation about the longitudinal or x axis of the dispenser, which could impart undesired rotation on the payload as it is ejected.

Figure 5B:
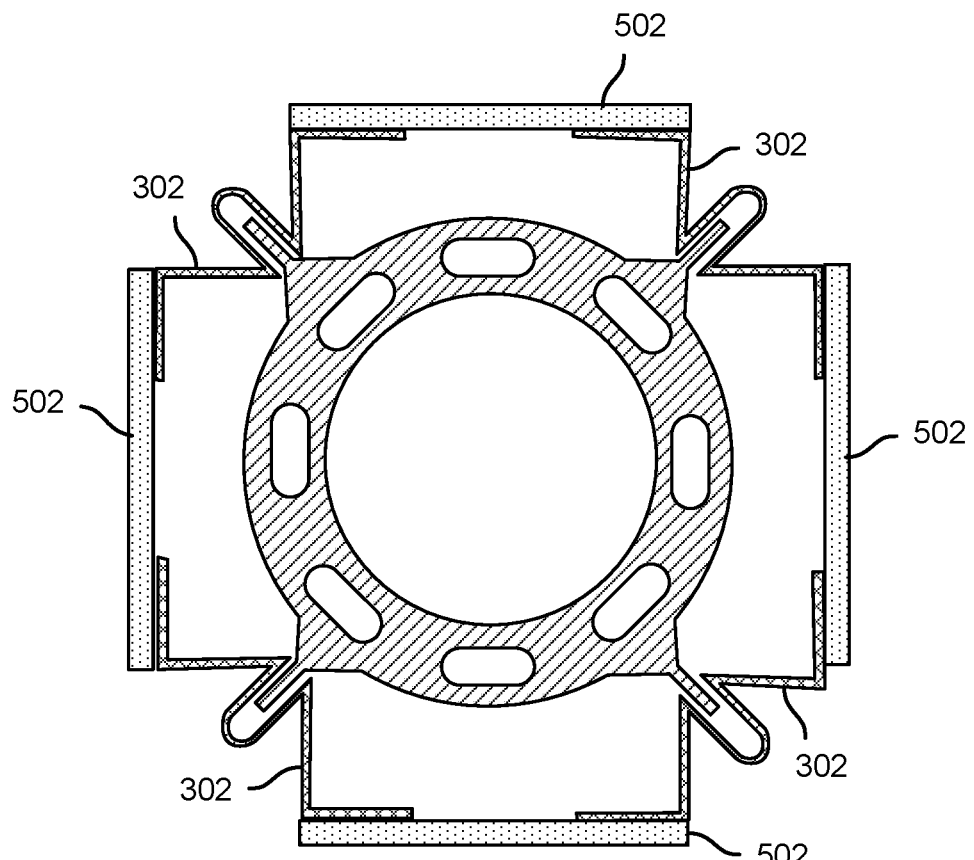
FIG. 5B is a diagram illustrating additional elements of the satellite dispenser with composite guide rails of FIG. 5A.

FIG. 5B is a diagram illustrating additional elements of the satellite dispenser with composite guide rails of FIG. 5A. In the example shown, side panels 502 have been bonded (e.g., adhesively) to the guide rails 302 as shown in FIG. 5A.

In various embodiments, the side panels 502 are made of carbon fiber reinforced polymer composites with phenolic impregnated aramid honeycomb cores sandwiched in the middle. The sandwich core may be a $\frac{1}{16}$th inch thick aramid honeycomb that provides rigidity to the carbon composite skins. Honey comb layer is laid up between the carbon fiber during the layup process and is cured with the skins in place. In some embodiments, the sandwich core is a $\frac{1}{8}$th inch thick aluminum honeycomb that provides rigidity to the carbon composite skins. The honeycomb core is perforated to allow excess gasses to escape, preventing the honeycomb cells from collapsing due to excessive pressures.

In some embodiments, access ports are cut out from the panels and post processed with additional carbon fiber patches to cover the exposed honey comb edges. Threaded inserts are then epoxied into the skin to provide mounting points for the access port panels. The panels are cut and bent sheet metal aluminum that are lightweight and low cost to manufacture.

Figure 5C:
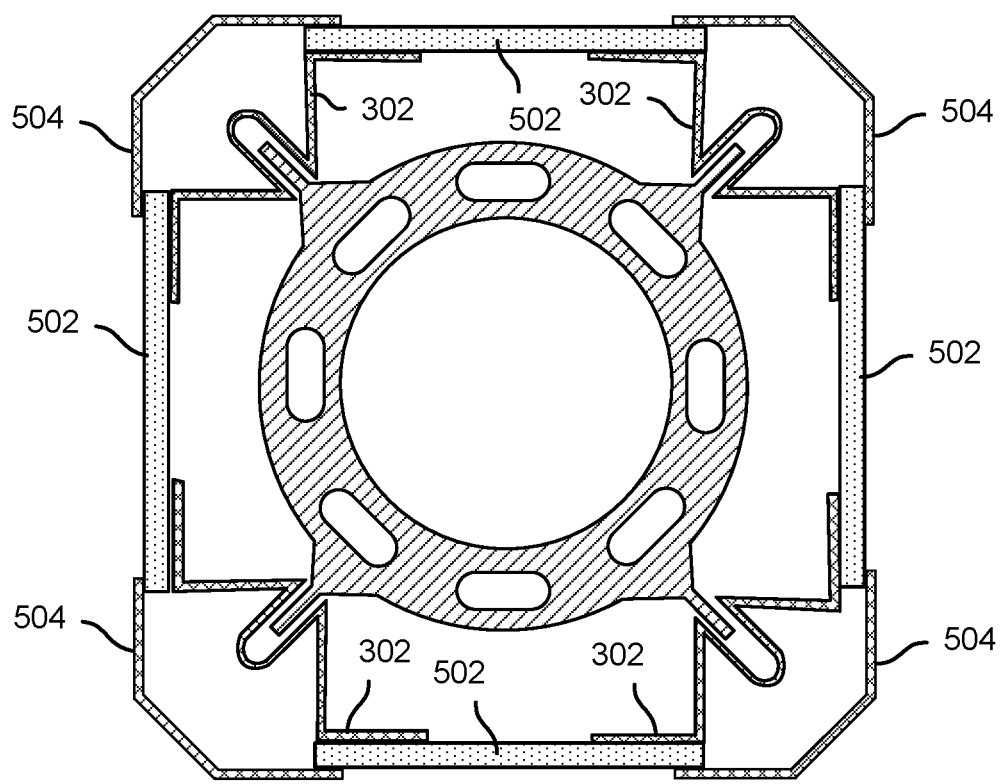
FIG. 5C is a diagram illustrating additional elements of the satellite dispenser with composite guide rails of FIG. 5A.

FIG. 5C is a diagram illustrating additional elements of the satellite dispenser with composite guide rails of FIG. 5A. In the example shown, corner pieces 504 have been bonded to the side panels 502. In various embodiments, the outer corner pieces are simple carbon composite laminates that conform to the shape of the end frames. In some embodiments, the corner pieces 504 help to provide a rigid backbone for the dispenser body structure.

Figure 5D:
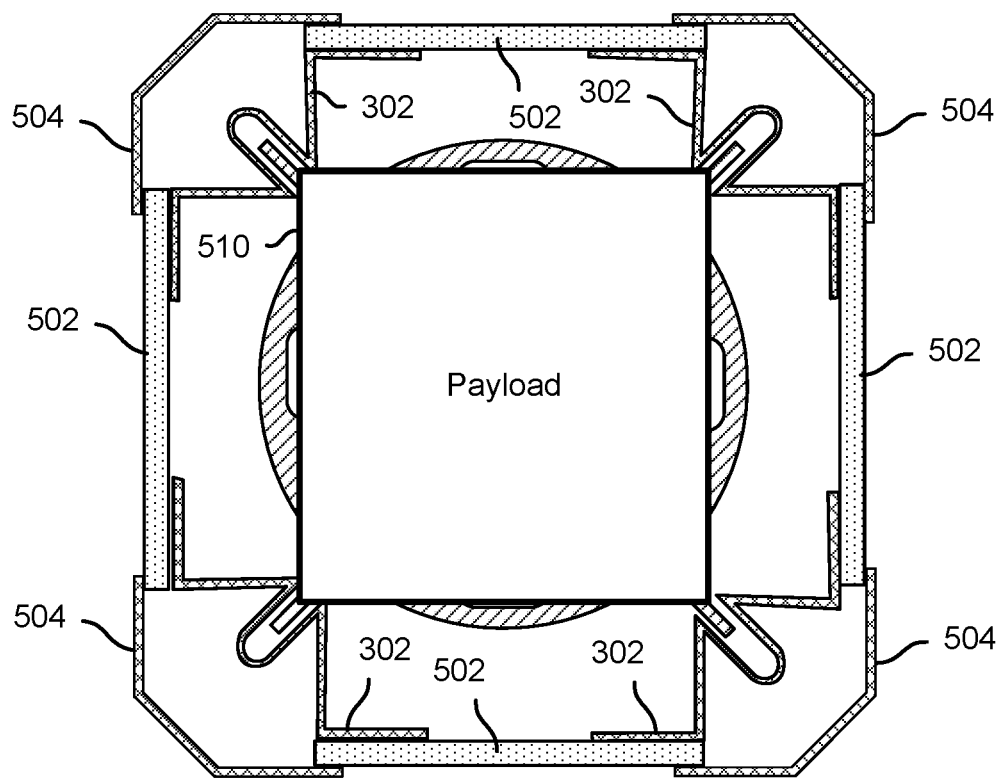
FIG. 5D is a diagram illustrating the satellite dispenser with composite guide rails of FIGS. 5A, 5B, and 5C with a satellite payload inserted.

FIG. 5D is a diagram illustrating the satellite dispenser with composite guide rails of FIGS. 5A, 5B, and 5C with a satellite payload inserted. In the example shown, a payload 510 has been inserted into the dispenser and press against the pusher plate 402. As shown, the four corners (e.g., CubeSat rails) of payload 510 engage the grooves defined by and ride on the inner surface of the guide rails 302.

In various embodiments, a small scale satellite dispenser as disclosed herein is fabricated at least in part by bonding sides to composite guide rails, as in FIG. 5B; adding corner pieces, as in FIG. 5C; installing at one end of the resulting assembly a pusher plate assembly that includes an end plate or panel, as in FIGS. 4A and 4B; and installing at the opposite end a door assembly, e.g., as shown in FIGS. 2A and 2B.

In various embodiments, a dispenser with composite guide rails as disclosed herein provides reliable deployment with minimum weight and cost of materials.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A satellite dispenser, comprising:
   a dispenser body defining an interior cavity configured to receive a payload, wherein the dispenser body comprises:

one or more sides, the one or more sides respectively comprising a carbon fiber reinforced polymer composite and a honeycomb core; and a plurality of composite guide rails respectively comprising a groove configured to receive at least a portion of the payload, wherein:

each of plurality of composite guide rails has an orientation that substantially aligns a longitudinal axis of the groove with an ejection axis of the dispenser;

each of the plurality of composite guide rails is comprised in a respective corner of the dispenser body;

an exterior profile of the composite guide rail is enclosed within the dispenser body; and the composite guide rail is mounted within the dispenser body.

2. The satellite dispenser of claim 1, wherein the composite guide rail is included in a set of four composite guide rails, and each guide rail located at a corresponding edge of the interior cavity.

3. The satellite dispenser of claim 1, wherein the composite guide rail defines in part the interior cavity.

4. The satellite dispenser of claim 1, wherein the dispenser comprises four composite guide rails arranged in a rectangular array and the dispenser body comprises four side panels each bonded to two adjacent ones of the composite guide rails.

5. The satellite dispenser of claim 1, wherein the composite guide rail comprises a silicon carbide layer at a payload-facing outer layer of the composite guide rail.

6. The satellite dispenser of claim 1, further comprising a pusher plate assembly at an end of the dispenser opposite a door opening of the dispenser body, wherein the pusher plate assembly includes a pusher plate comprising a protrusion that extends at least in part into the groove of the composite guide rail.

7. The satellite dispenser of claim 6, wherein the groove of the composite guide rail substantially aligns the pusher plate to traverse the longitudinal axis of the groove in connection with ejecting the payload from the dispenser body.

8. The satellite dispenser of claim 6, wherein the dispenser includes four composite guide rails, each at a corresponding location within the interior cavity, and the pusher plate includes four protrusions, each extending at least in part into the respective groove of a corresponding one of the composite guide rails.

9. The satellite dispenser of claim 1, wherein the composite guide rail is fabricated at least in part by laying up layers of pre-impregnated carbon or other fiber reinforced fabric on a mold having a shape associated with the composite guide rail.

10. The satellite dispenser of claim 9, wherein the mold defines the groove of the composite guide rail.

11. The satellite dispenser of claim 1, wherein the composite guide rail comprises substantially orthogonal outer flanges joined by central lobe that defines the groove.

12. The satellite dispenser of claim 11, wherein each of the outer flanges is bonded to an associated side panel comprising the dispenser body.

13. The satellite dispenser of claim 1, wherein the composite guide rail comprises carbon composite laminates.

14. The satellite dispenser of claim 13, wherein the carbon composite laminates have a profile that conforms to a shape of the dispenser along the ejection axis of the dispenser.

15. The satellite dispenser of claim 1, wherein the composite guide rail comprises a silicon carbide.

16. The satellite dispenser of claim 15, wherein:

the composite guide rail further comprises a plurality of layers comprising carbon fibers;

the silicon carbide is disposed on top of the plurality of layers; and the silicon carbide forms a surface that interfaces with a rail on the payload, wherein the rail on the payload forms at least part of a profile of the payload.

17. The satellite dispenser of claim 16, wherein:

the satellite dispenser further comprises one or more side panels; and the one or more side panels comprise carbon fiber reinforced polymer composites.

18. The satellite dispenser of claim 17, wherein:

the honeycomb core comprises phenolic impregnated aramid honeycomb cores.

19. The satellite dispenser of claim 1, wherein the honeycomb core comprises an aluminum honeycomb.

20. The satellite dispenser of claim 1, wherein the dispenser body has a rectangular profile, and the plurality of composite guide rails comprises four guide rails respectively disposed in the four corners of the inner cavity of the dispenser body.

21. The satellite dispenser of claim 1, wherein each of the plurality of composite guide rails comprises a cross-sectional geometry that defines the groove, and the groove is configured to receive a corner of the payload.

22. The satellite of dispenser of claim 1, further comprising a pusher plate, wherein the pusher plate pushes the payload to a front side of the satellite dispenser to eject the payload, and the pusher plate comprises a plurality of protrusions, and each of the protrusions is configured to extend into the groove of a corresponding composite guide rail.

* * * * *